United States Patent [19]

Akazawa

[11] Patent Number: 5,111,479
[45] Date of Patent: May 5, 1992

[54] SPREAD SPECTRUM RECEIVER AND CARRIER SENSE CIRCUIT THEREFOR

[75] Inventor: Shigeo Akazawa, Tokyo, Japan

[73] Assignee: Clarion Co., Ltd., Tokyo, Japan

[21] Appl. No.: 605,258

[22] Filed: Oct. 26, 1990

[30] Foreign Application Priority Data

Nov. 2, 1989 [JP] Japan ................ 1-286879

[51] Int. Cl.⁵ .......................... H04L 27/30
[52] U.S. Cl. ........................ 375/1; 380/34; 375/80; 375/94; 375/106
[58] Field of Search ......... 375/1, 80, 82, 94, 106; 380/34, 46, 48; 329/311

[56] References Cited

U.S. PATENT DOCUMENTS

4,626,789 12/1986 Nakata et al. ............ 329/311
4,943,975 7/1990 Kurihara et al. ............ 375/1

FOREIGN PATENT DOCUMENTS

2-123838 5/1990 Japan .

*Primary Examiner*—Bernarr E. Gregory
*Attorney, Agent, or Firm*—Flynn, Thiel, Boutell & Tanis

[57] ABSTRACT

A carrier sense circuit for sensing a carrier component of a received signal in a spread spectrum system includes a multiplier which produces a squared signal by multiplying the received signal by itself, a filter which extracts from the squared signal a carrier component of a spread spectrum signal included in the squared signal, and a detecting circuit which detects the level of the carrier component and which outputs a carrier sense signal when the level of the carrier component is greater than a predetermined level. The filter is a band pass filter having a central frequecny of $2f_c$ where $f_c$ is the central frequency of the spread spectrum signal. Where the spread spectrum system includes an initial synchronization circuit, and a correlation arrangement which correlates the received signal with a reference signal to produce correlation pulses, a circuit can be provided to start the initial synchronization circuit in response to simultaneous occurrence of the carrier sense signal and one of the correlation pulses.

6 Claims, 7 Drawing Sheets

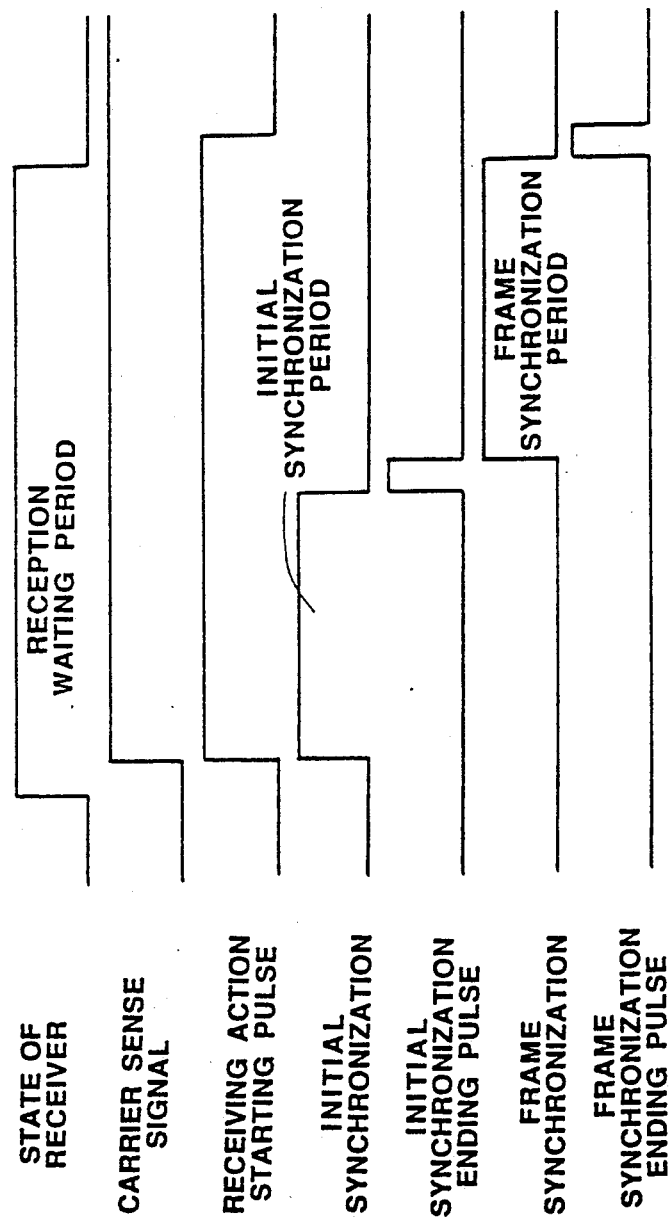

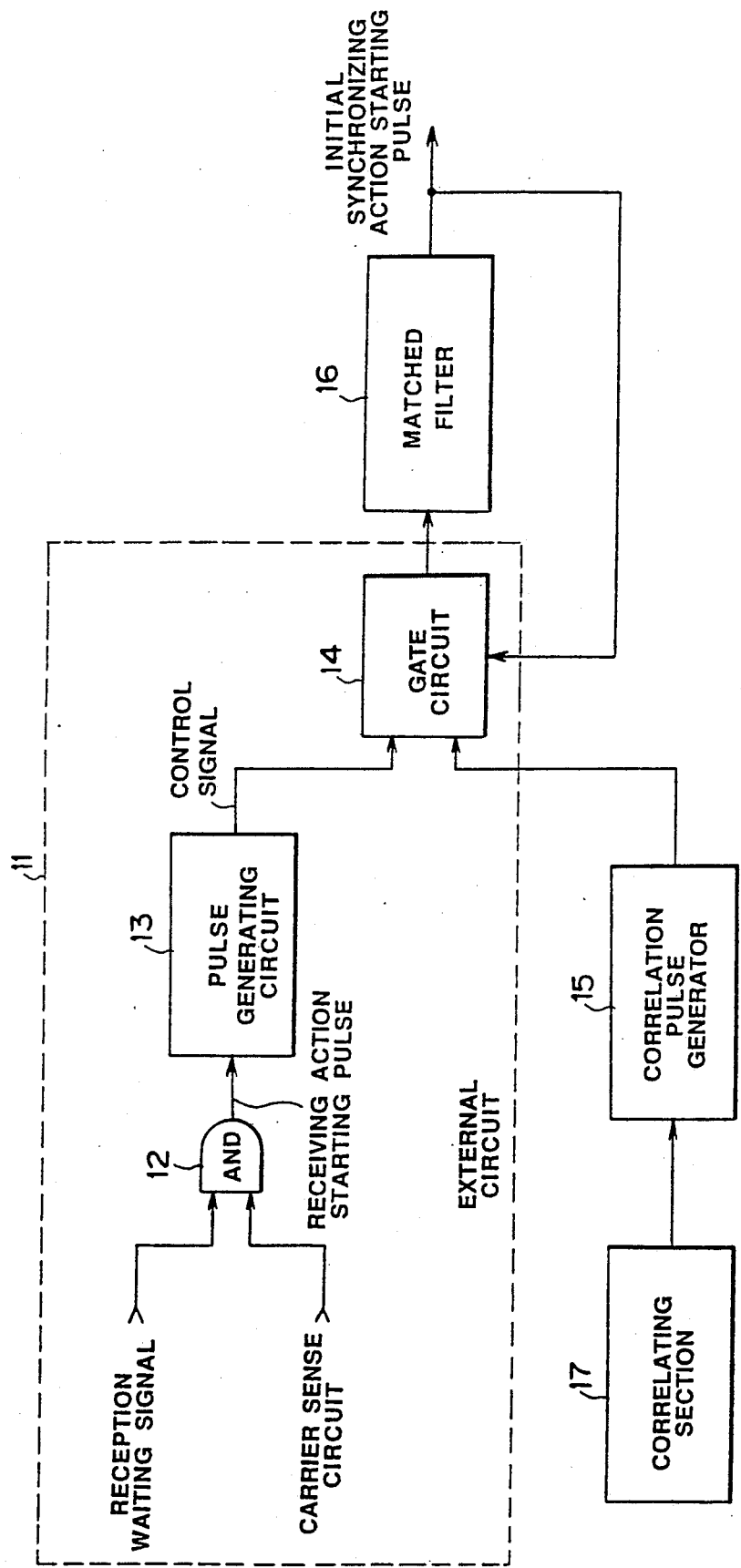

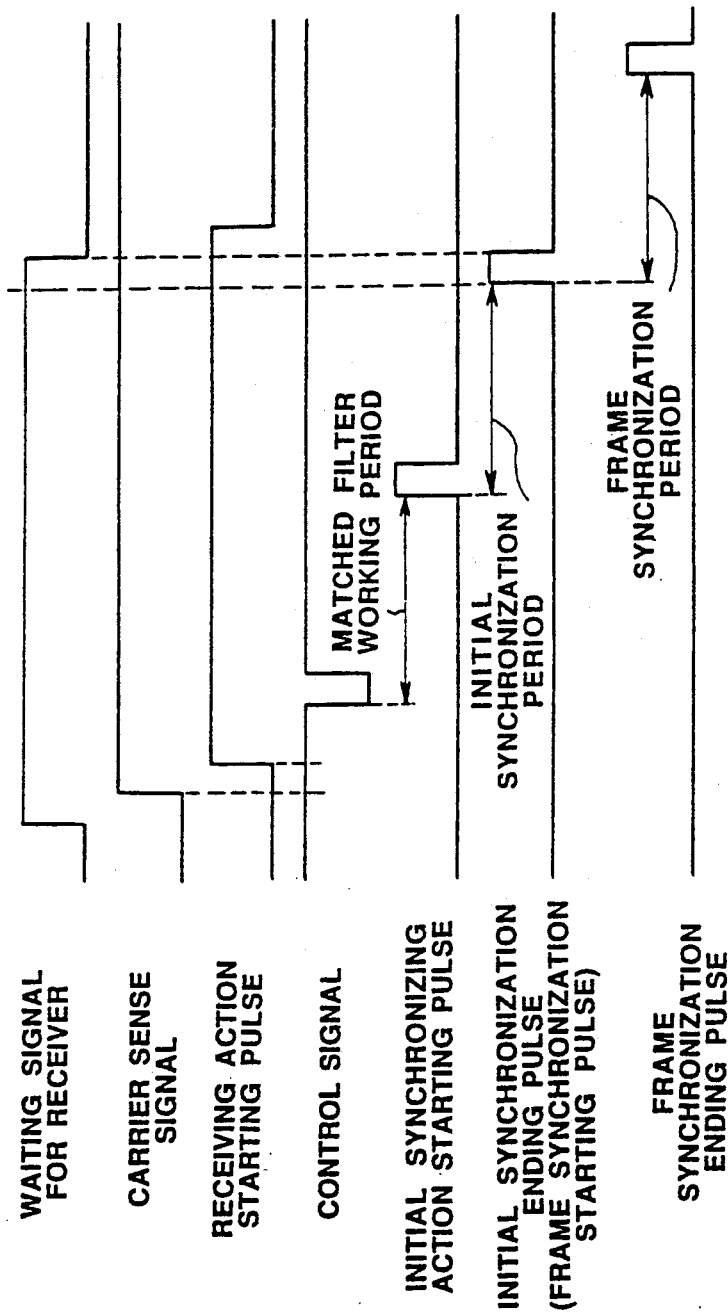

5,111,479

SPREAD SPECTRUM RECEIVER AND CARRIER SENSE CIRCUIT THEREFOR

FIELD OF THE INVENTION

The present invention relates to a spread spectrum (hereinbelow abbreviated to SS) receiver and in particular to a carrier sense circuit improved so as to be suitable for use in the SS receiver.

BACKGROUND OF THE INVENTION

The spread spectrum communication (hereinbelow abbreviated to SSC) is a communication system, by which the band width of an information signal to be transmitted is spread several tens of times to several hundreds of times for transmitting the signal and as features thereof secrecy and concealing property can be cited. Further, since the electric power density is low, it is compatible with the narrow frequency band communication effected heretofore.

In the SSC as described above and in particular in an SS receiver, it is necessary to detect a carrier sense signal from a received signal and to obtain a signal for starting an initial synchronization circuit for a pseudo noise code therefrom. In a Japanese patent application entitled "Spread Spectrum Receiver" filed Oct. 9, 1987 by the applicant of the present invention (application Ser. No. , later published as JP-P-1-98338A, and corresponding to U.S. Pat. No. 4,943,975 synchronization circuit in the following stage is started by the carrier sense signal and a signal indicating the state of the receiver (reception wait state). This signal is described as a "receiving operation starting pulse" in the patent application stated above.

When the SS receiver detects the SS signal, it outputs the carrier signal. At this time, if the receiver is not in the state, where it can receive the signal, the initial synchronization circuit effects nothing. On the contrary, if the receiver is in the state, where it can receive the signal, and the reception wait signal is present, the initial synchronization circuit begins an operation of the initial synchronization for the pseudo noise code. When the initial synchronization is terminated, a starting pulse is outputted for performing the synchronization (frame synchronization) for detecting next the starting position of data. A frame synchronizing circuit is started by this signal to detect the starting position of data. When the frame synchronization is terminated, the wait state of the receiver is removed and demodulation is performed from the starting point of the data. The timing of this operation is indicated in FIG. 3.

By this carrier sense method the output of a correlator is counted and the count output is used as the carrier sense signal. Further, as a general carrier sense method, there is known a method, by which the AGC voltage of the high frequency amplifying section is used as the carrier sense signal, as disclosed e.g. in JP-P-2-123838A.

By this method, in an SS receiver having a correlator 30, a variable gain amplifier 31, a demodulator 32, an AGC circuit 33, etc., as indicated in FIG. 8, a gain control signal is outputted to the variable gain amplifier 31, responding to a correlation spike outputted by the demodulator and at the same time the carrier sense signal is obtained, responding to this gain control signal.

However, in the case where the output of the correlator is used as the carrier sense signal, an SSC signal having a different code cannot be detected and on the other hand, in the case where the AGC voltage of the high frequency amplifying section is used as the carrier sense signal, there is a drawback that the SSC signal cannot be detected correctly, because the initial synchronization circuit in the receiver reacts not only to the SSC signal but also to a signal of the narrow band communication.

OBJECT OF THE INVENTION

The object of the present invention is to provide a carrier sense method capable of detecting correctly only the SSC signal from the received signal in the SS receiver.

SUMMARY OF THE INVENTION

In order to achieve the above object, an SS receiver according to the present invention is characterized in that it comprises a carrier sense circuit consisting of operating means for forming the squared signal of a received signal, a filter for extracting a carrier component of an SSC signal contained in the squared signal, and a detecting circuit for detecting the level of the extracted carrier component to output a carrier sense signal.

The received signal is squared and the squared signal thus obtained is made pass through the filter. In this way only the carrier component of the SSC wave is extracted and the carrier sense signal is detected from this carrier component.

BRIEF DESCRIPTION OF THE DRAWINGS

FIG. 3 is timing chart for explaining the operation of an initial synchronization circuit responding to a general carrier sense signal;

FIG. 4 is a block diagram indicating an embodiment, in the case where the carrier sense signal detected by the carrier sense circuit according to the present invention is used for starting the initial synchronization circuit in the SS receiver;

FIG. 5 is a timing chart for explaining the operation of the embodiment;

DETAILED DESCRIPTION

Figure 1:
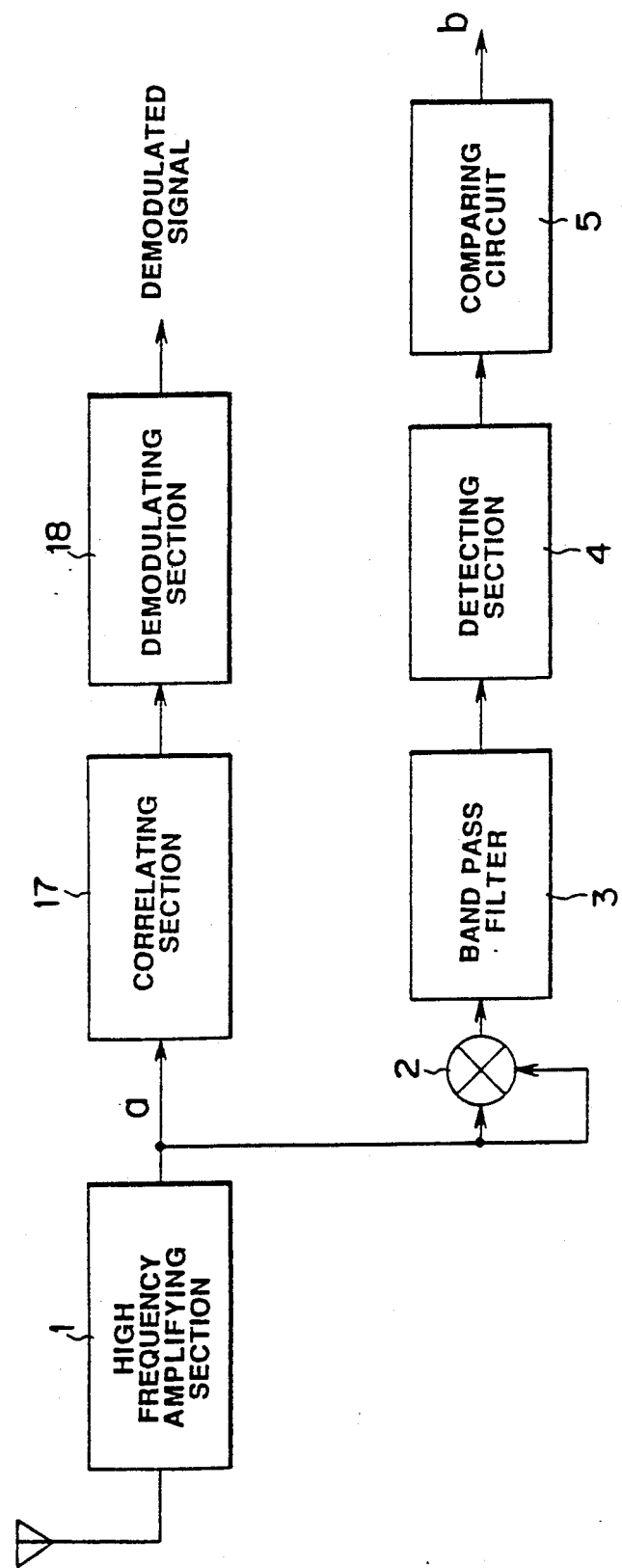
FIG. 1 is a block diagram indicating an embodiment of the present invention.

FIG. 1 is a block diagram indicating the construction of a carrier sense circuit used in an SS receiver according to the present invention, in which reference numeral 1 is a high frequency amplifying section; 2 is a multiplier serving as squared signal forming means; 3 is a band pass filter; 4 is a detecting section; 5 is a comparing circuit; a is a received signal (which reaches a demodulating section 18 through a correlating section 17); and b is a carrier sense signal.

Hereinbelow the operation of the embodiment described above will be explained.

Figure 2A:
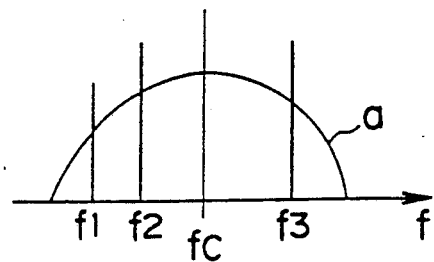
FIGS. 2A, 2B and 2C show frequency distributions for explaining the operation of the embodiment.
Figure 2B:
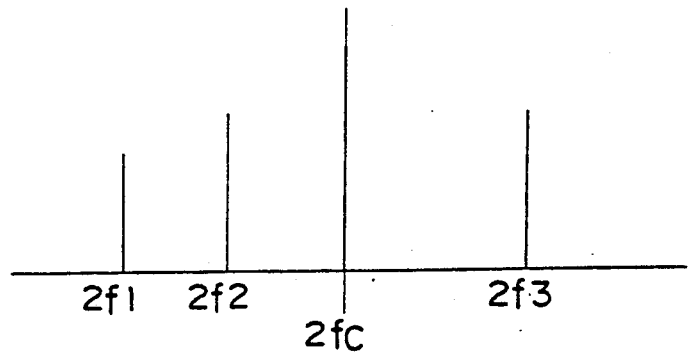

FIG. 2A indicates the spectrum of the received signal a amplified by the high frequency amplifying section 1, in which f represents the central frequency of the desired SSC wave and $f_1$, $f_2$, $f_3$ represent not desired narrow band signals. It is possible to reproduce the carrier of the SSC wave independently of the spreading code by multiplying the received signal by itself by means of the multiplier 2. The spectrum of the output of the multiplier 2 is as indicated in FIG. 2B.

Figure 2C:
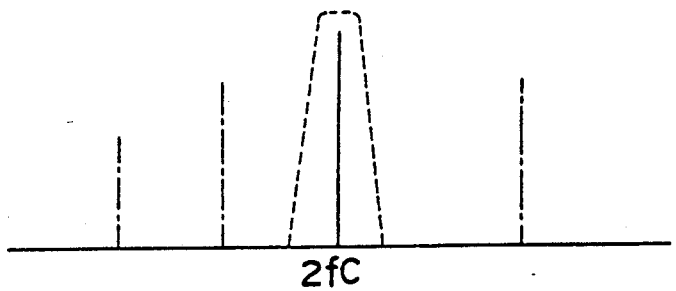

It is possible to extract only the carrier component of the SSC wave by making this signal pass through the band pass filter 3, whose central frequency is $2f_c$. This aspect is indicated in FIG. 2C, in which the dotted line represents characteristics of the band pass filter.

This extracted carrier component of the SSC wave is detected by the detecting section 4 and the carrier sense signal b is obtained by detecting the level of the detected signal by means of the comparing section 5. The comparing section 5 includes e.g. a comparator, etc., which compares the level of the detected signal with a predetermined level to output the carrier sense signal, when the former exceeds the latter.

Further, by squaring the received signal the frequency difference between the central frequency $2f_c$ of the desired signal and the not desired signals $2f_1$, $2f_2$, $2f_3$, becomes greater and it is easier to extract the desired signal.

FIG. 4 shows an embodiment, in the case where the carrier sense signal detected by the carrier sense circuit according to the present invention described above is used for starting the initial synchronization circuit in the SS receiver.

In the FIGURE, 11 is e.g. an external circuit for starting the initial synchronization circuit in the SS receiver described above and it consists of an AND circuit 12, a pulse generating circuit 13 and a gate circuit 14.

The reception wait signal indicating the reception wait state described previously and the carrier sense signal from the circuit indicated in FIG. 1 are inputted to the AND circuit 12, by which the receiving operation starting pulse described above is outputted as the AND out, which pule is given to the pulse generating circuit 13.

Consequently, when the reception wait signal is at the "H" level, at which the receiver is receivable, e.g. as indicated in FIG. 5, if the carrier sense signal is at the "H" level, the receiving operation starting pulse is outputted from the AND circuit 12 to the pulse generating circuit 13.

The pulse generating circuit 13 outputs the control signal indicated in FIG. 5 to the gate circuit 14, responding to the pulse described above.

The gate circuit 14 is inserted e.g. between a correlation pulse generator 15 and a matched filter 16 constituting a part of the initial synchronization circuit described above, as indicated in FIG. 4. When the gate circuit 14 is triggered by the control signal, the correlation pulse generator 15 outputs a correlation pulse corresponding to an output correlation spike of the correlating section 17 to the matched filter 16 through the gate circuit 14.

Thereafter, when the initial synchronizing operation starting pulse is outputted by the matched filter 16, in order to avoid erroneous operations, the gate circuit 14 gates the correlation pulse towards the matched filter 16 till the succeeding receiving operation by feeding back the output of the matched filter 16 to the gate circuit 14.

Figure 6:
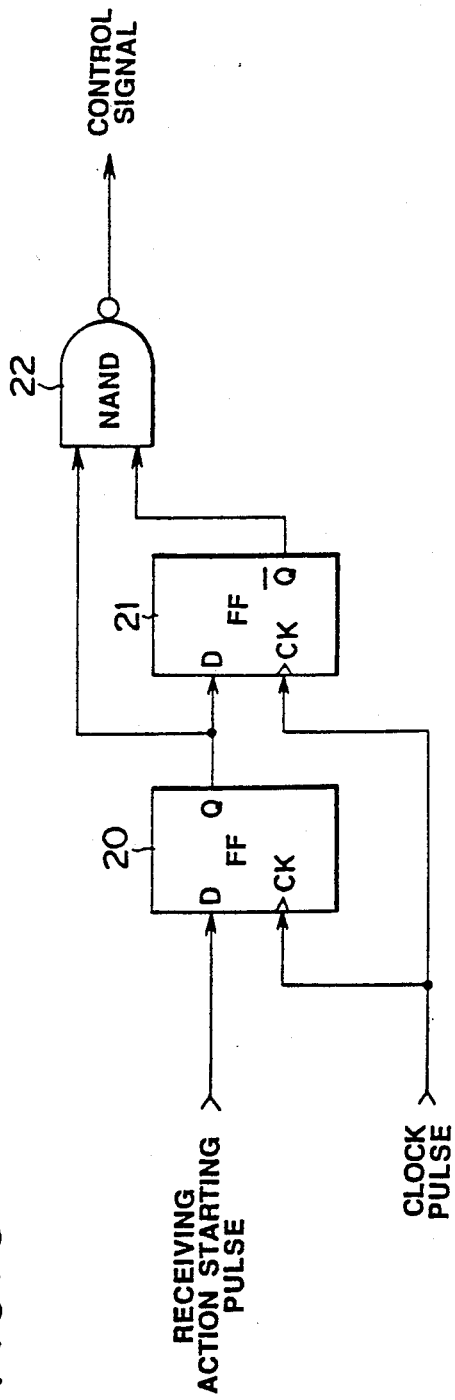
FIGS. 6 and 7 are schemes showing the construction of a pulse generating circuit and a gate circuit, respectively, used in the embodiment indicated in FIG. 4.

FIG. 6 shows an example of the construction of the pulse generating circuit 13, in which 20 and 21 are flip-flops and 22 is an NAND circuit.

Figure 7:
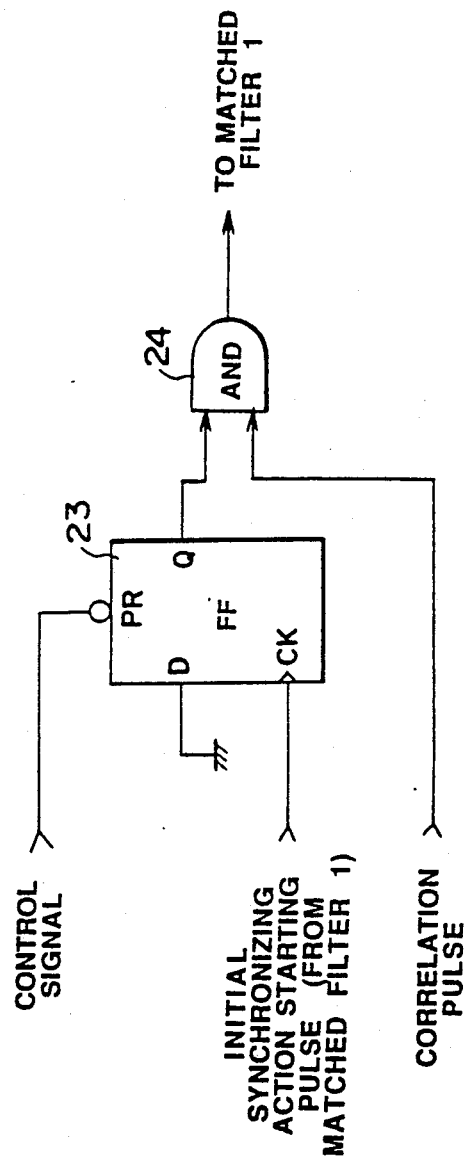
Figure 8:
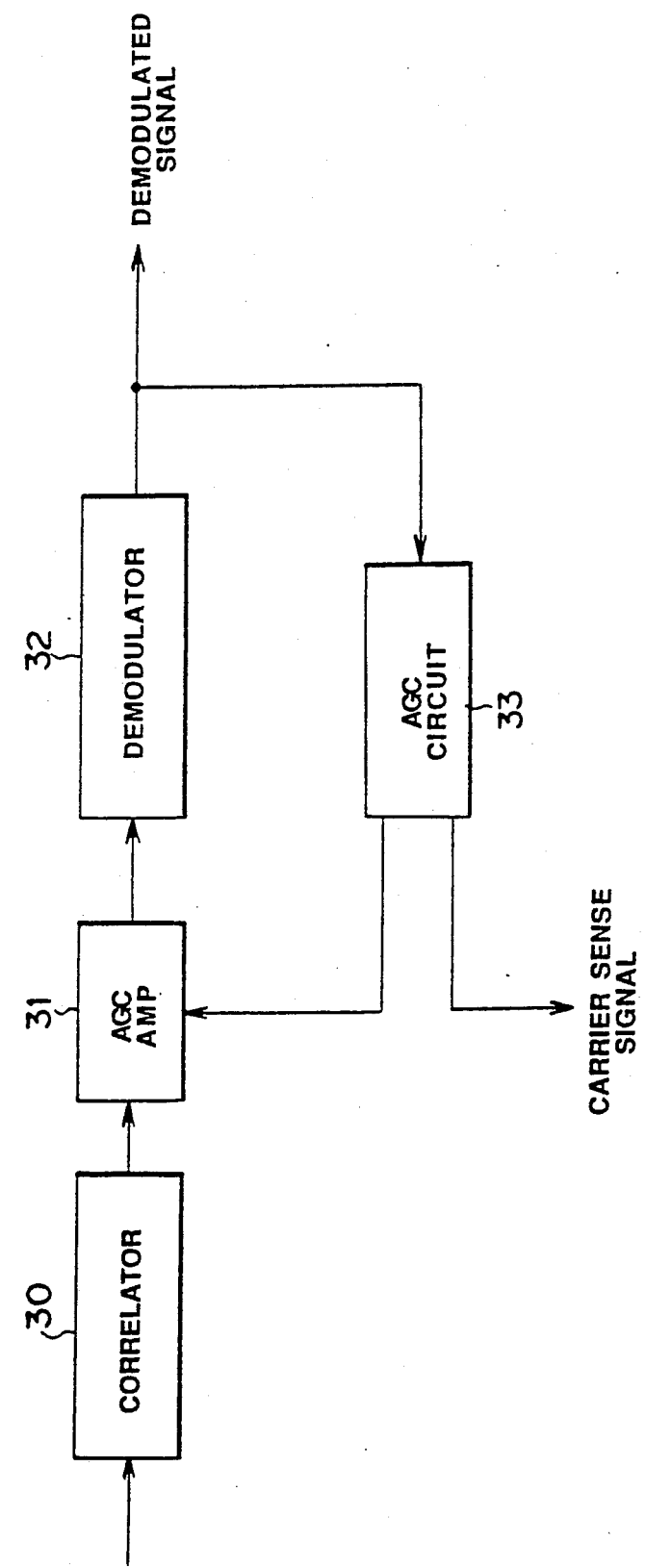
FIG. 8 is a block diagram indicating an example of a prior art carrier sense system.

FIG. 7 shows an example of the construction of the gate circuit 14, in which 24 is a flipflop and 25 is an AND circuit.

The initial synchronization circuit carries out the initial synchronizing operation, responding to the initial synchronizing operation starting pulse.

As explained above, according to the present invention, in an SS receiver, it is possible to detect precisely and easily a carrier sense signal and to make an initial synchronization circuit execute a precise initial synchronizing operation by using the carrier sense signal stated above.

While particular embodiments of the invention have been shown and described, it will be obvious to those skilled in the art that various changes and modifications may be made without departing from the present invention in its broader aspect.

What is claimed is:

1. A carrier sense circuit used in a spread spectrum receiver for sensing a carrier component of a received signal, comprising:
   operating means for outputting a squared signal which is a received signal multiplied by itself;
   a filter for extracting from said squared signal a carrier component of a spread spectrum signal included in said squared signal, said filter outputting said carrier component; and
   a detecting circuit for detecting the level of said carrier component and for outputting a carrier sense signal when the level of said carrier component is greater than a predetermined level.

2. A carrier sense circuit according to claim 1 wherein said filter is a band pass filter having a central frequency of $2f_c$, $f_c$ being the central frequency of said spread spectrum signal.

3. A carrier sense circuit according to claim 1 wherein said operating means includes a multiplier, which multiplies said received signal by itself.

4. A circuit for use in a spread spectrum receiver, said circuit comprising:
   operating means for outputting a squared signal which is a received signal multiplied by itself;
   a filter for extracting from said squared signal a carrier component of a spread spectrum signal included in said squared signal, said filter outputting said carrier component;
   a detecting circuit for detecting the level of said carrier component and for outputting a carrier sense signal when the level of said carrier component is greater than a predetermined level; and
   means for starting an initial synchronization circuit of a spread spectrum receiver in response to said carrier sense signal and a correlation pulse.

5. A circuit according to claim 4 wherein said filter is a band pass filter having a central frequency of $2f_c$, $f_c$ being the central frequency of said spread spectrum signal.

6. A spread spectrum receiver according to claim 4 wherein said operating means includes a multiplier, which multiplies said received signal by itself.

* * * * *